US008738704B2

(12) United States Patent
Stark et al.

(10) Patent No.: US 8,738,704 B2
(45) Date of Patent: May 27, 2014

(54) PUBLISH/SUBSCRIBE BROKER MESSAGING SYSTEM AND METHOD

(75) Inventors: Daniel Stark, Webster, NY (US); Jeremy Lee Reitz, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 595 days.

(21) Appl. No.: 12/876,926

(22) Filed: Sep. 7, 2010

(65) Prior Publication Data

US 2012/0059882 A1 Mar. 8, 2012

(51) Int. Cl.
G06F 15/16 (2006.01)

(52) U.S. Cl.
USPC .......................................... 709/205; 709/206

(58) Field of Classification Search
USPC .................................................. 709/205, 206
See application file for complete search history.

(56) References Cited

U.S. PATENT DOCUMENTS

| 5,557,798 | A  | * | 9/1996  | Skeen et al. ................... 705/35 |
| 7,237,037 | B2 |   | 6/2007  | Wells et al. ................... 709/246 |
| 7,349,980 | B1 |   | 3/2008  | Darugar et al. ............... 709/238 |
| 7,376,832 | B2 |   | 5/2008  | Diep et al. .................... 713/155 |
| 7,571,195 | B2 | * | 8/2009  | Billingsley et al. .................. 1/1 |
| 7,672,275 | B2 |   | 3/2010  | Yajnik et al. ................. 370/332 |
| 7,814,225 | B2 | * | 10/2010 | Rumelhart .................... 709/238 |
| 7,921,427 | B2 | * | 4/2011  | Parthasarathy et al. ....... 719/313 |
| 8,112,450 | B2 | * | 2/2012  | Thomas et al. ............... 707/802 |
| 2003/0126077 | A1 |   | 7/2003  | Kantor et al. ................... 705/40 |
| 2005/0278410 | A1 |   | 12/2005 | Espino .......................... 709/201 |
| 2006/0047666 | A1 |   | 3/2006  | Bedi et al. ...................... 707/10 |
| 2006/0277319 | A1 |   | 12/2006 | Elien et al. .................... 709/239 |
| 2007/0067779 | A1 | * | 3/2007  | Gilfix et al. ................... 719/313 |
| 2008/0010645 | A1 | * | 1/2008  | Gupta et al. ................... 719/312 |
| 2008/0235246 | A1 | * | 9/2008  | Hampapur et al. ............ 707/100 |
| 2008/0288655 | A1 | * | 11/2008 | Zhao et al. .................... 709/238 |
| 2009/0070779 | A1 | * | 3/2009  | Wang et al. ................... 719/314 |
| 2009/0147780 | A1 | * | 6/2009  | Guo et al. ...................... 370/389 |
| 2009/0222573 | A1 | * | 9/2009  | Grossner et al. ............... 709/235 |
| 2009/0287761 | A1 | * | 11/2009 | Hawkins et al. ............... 709/202 |
| 2010/0023587 | A1 | * | 1/2010  | Fletcher et al. ............... 709/206 |
| 2010/0049693 | A1 | * | 2/2010  | Cao et al. .......................... 707/2 |
| 2010/0093441 | A1 | * | 4/2010  | Rajaraman et al. ............. 463/42 |
| 2010/0223560 | A1 | * | 9/2010  | Shenfield et al. ............. 715/744 |
| 2011/0125921 | A1 |   | 5/2011  | Karenos et al. ............... 709/240 |
| 2011/0258637 | A1 | * | 10/2011 | Bezdicek et al. ............. 719/314 |
| 2011/0320555 | A1 | * | 12/2011 | Qiu et al. ....................... 709/207 |

* cited by examiner

Primary Examiner — Waseem Ashraf
(74) Attorney, Agent, or Firm — Luis M. Ortiz; Kermit D. Lopez; Ortiz & Lopez, PLLC

(57) ABSTRACT

A publish/subscribe broker messaging system and method for processing a data message based on a message broker scheduling algorithm. The scheduling algorithm can be configured in association with a message broker to receive and transmit the data message associated with one or more publishers to a subscriber. The subscriber can register a subscription with respect to the message broker to receive the data message based on a selected topic. An attribute can be added to the selected topic description based on the scheduling algorithm in order to schedule the data message from the publisher with respect to the selected topic via the message broker. The data message with respect to the selected topic from the publisher can be processed sequentially and the scheduling algorithm can process other topics simultaneously. The data messages from other publishers with similar topic can also be processed simultaneously in order to transmit a high volume of message while ensuring high levels of service.

8 Claims, 5 Drawing Sheets

PUBLISH/SUBSCRIBE BROKER MESSAGING SYSTEM AND METHOD

TECHNICAL FIELD

Embodiments are generally related to publish/subscribe data processing systems and methods. Embodiments are also related to broker-based publish/subscribe messaging techniques. Embodiments are additionally related to methods for processing a message via a message broker.

BACKGROUND OF THE INVENTION

Publish/subscribe data processing systems generally distribute a data message (e.g., publication) from a publisher to a subscriber via a message broker. The subscriber can register an interest with the message broker in order to receive the data message from the publisher with respect to a particular message topic and/or content. The message broker typically assures the integrity of the message source, and manages the distribution of the data message according to a valid subscription registered in the broker. Such decoupling of publisher and subscriber can permit greater scalability and a more dynamic network topology.

Most of the prior art publish/subscribe data processing systems employ a queuing algorithm for processing the data messages in a first-in/first-out fashion. Such systems characterize the data messages into one or more classes and/or topics without knowledge of the subscribers. FIG. 1 illustrates a block diagram of a prior art publish/subscribe data processing system 100 associated with a message broker 110. The publish/subscribe data processing system 100 generally includes one or more publishers 130 and 135 that connect to the publish/subscribe message broker 110. The message broker 110 manages the distribution of the data messages 160 in accordance with a valid subscription registered in the message broker 110. The publishers 130 and 135 transmit the data messages 160 to the message broker 110 and the message broker 110 distributes the data messages to a subscriber 140.

The message broker 110 includes a message queue 120 and multiple threads 150 for parallel distribution of the data messages 160 from the publishers 130 to the subscribers 140. The system 100 publishes the data messages 160 based on a topic and/or a named logical channel. The problem associated with such prior art approaches is that the data messages 160 transmitted by the publisher 135 must wait quite some time before transmission to the subscriber 140. Additionally, all other messages may be delayed a very long time before being processed leading to reduced levels of service. Due to the queuing algorithm, an individual publisher may flood the system 100 with the data messages 160 on a specific topic thus crippling the ability of other publishers 130 to communicate the data messages 325 to the subscribers 140.

Based on the foregoing, it is believed that a need exists for an improved publish/subscribe broker messaging system and method for processing a data message based on a message broker scheduling algorithm, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved publish/subscribe data processing system and method.

It is another aspect of the disclosed embodiments to provide for an improved publish/subscribe broker messaging system and method for processing a data message based on a message broker-scheduling algorithm.

The aforementioned aspects and other objectives and advantages can now be achieved as described herein. A publish/subscribe broker messaging system and method for processing a data message based on a message broker scheduling algorithm, is disclosed herein. The scheduling algorithm can be configured in association with a message broker to receive and transmit the data message associated with one or more publishers to a subscriber. The subscriber can register a subscription with respect to the message broker to receive the data message based on a selected topic. An attribute can be added to the selected topic description based on the scheduling algorithm in order to schedule the data message from the publisher with respect to the selected topic via the message broker. The data message with respect to the selected topic from the publisher can be processed sequentially and the scheduling algorithm can process other topics simultaneously. The data messages from other publishers with similar topic can also be processed simultaneously in order to transmit a high volume of message while ensuring high levels of service.

The message broker can be configured in association with a message queue with respect to multiple threads in order to receive and submit the data messages posted by the publishers to the subscriber based on the selected topic/content. The message broker accepts the subscription from the subscriber in order to perform a filtering function with respect to the data message. The message broker further includes a locking mechanism for ensuring a mutual exclusion of the data message between the message threads. The locking mechanism prevents duplication of message processing between the message threads. The message broker can perform a store and forward function in order to route the data messages from the publishers to the subscribers. Such an approach ensures a highly reliable and scalable message processing with respect to a publish/subscribe messaging environment.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
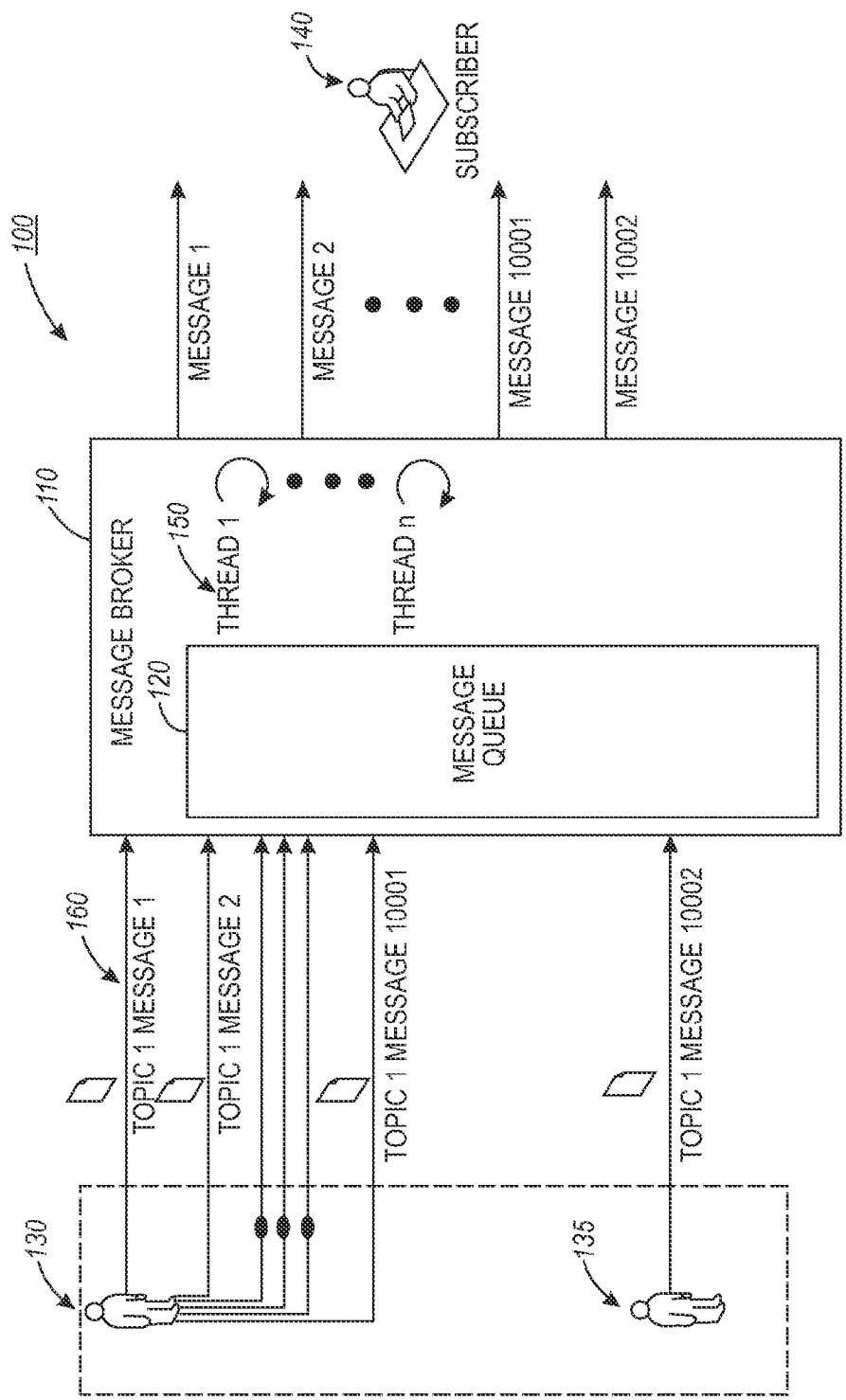
FIG. 1 illustrates a flow diagram of a prior art publish/subscribe data processing system.
Figure 2:
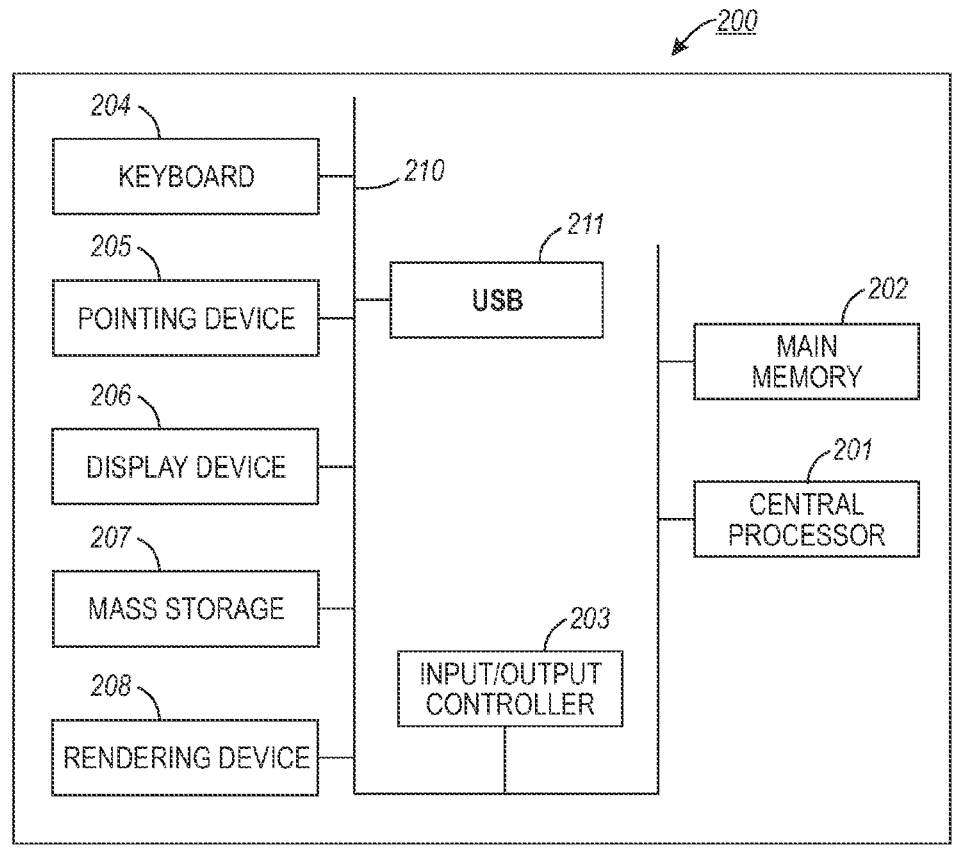
FIG. 2 illustrates a schematic view of a data-processing system in which an embodiment may be implemented.
Figure 3:
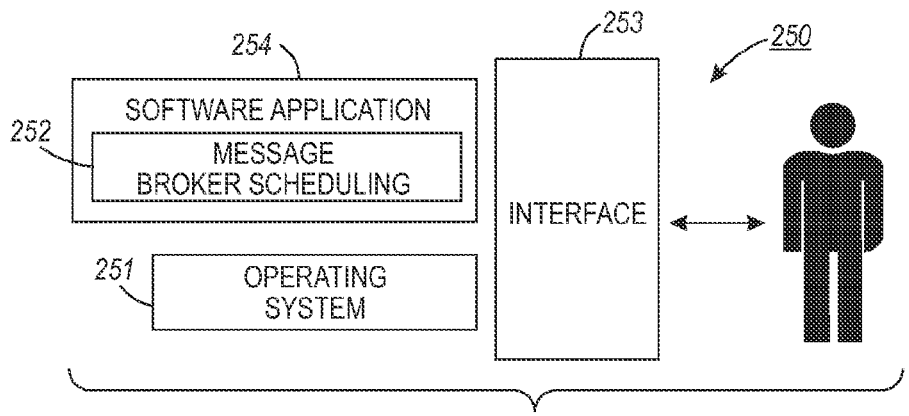
FIG. 3 illustrates a schematic view of a software system including, a messaging broker scheduling module, an operating system, application software, and a user interface for carrying out an embodiment.

FIGS. 2-3 are provided as exemplary diagrams of data-processing environments in which embodiments of the present invention may be implemented. It should be appreciated that FIGS. 2-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 2, the disclosed embodiments may be implemented in the context of a data-processing system 200 that includes, for example, a central processor 201, a main memory 202, an input/output controller 203, a keyboard 204, an input device 205 (e.g., a pointing device, such as a mouse, track ball, pen device, etc), a display device 206, a mass storage 207 (e.g., a hard disk), and a USB (Universal Serial Bus) peripheral connection 211. Additional input/output devices, such as a rendering device 208 (e.g., printer, scanner, fax machine, etc), for example, may be associated with the data-processing system 200 as desired. As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc.

FIG. 3 illustrates a computer software system 250 for directing the operation of the data-processing system 200 depicted in FIG. 2. Software application 254, stored in main memory 202 and on mass storage 207, generally includes a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data through user interface 253; these inputs may then be acted upon by the data-processing system 200 in accordance with instructions from operating system module 251 and/or software application 254.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 253, which is preferably a graphical user interface (GUI), can serve to display results, whereupon a user may supply additional inputs or terminate a particular session. In some embodiments, operating system 251 and interface 253 can be implemented in the context of a "Windows" system. It can be appreciated, of course, that other types of systems are potential. For example, rather than a traditional "Windows" system, other operation systems, such as, for example, Linux may also be employed with respect to operating system 251 and interface 253. The software application 254 can include, for example, a message broker scheduling module 252 for processing a data message between a publisher and a subscriber. Message broker scheduling module 252 can include instructions, such as those of a method 500 discussed herein with respect to FIG. 6.

Figure 4:
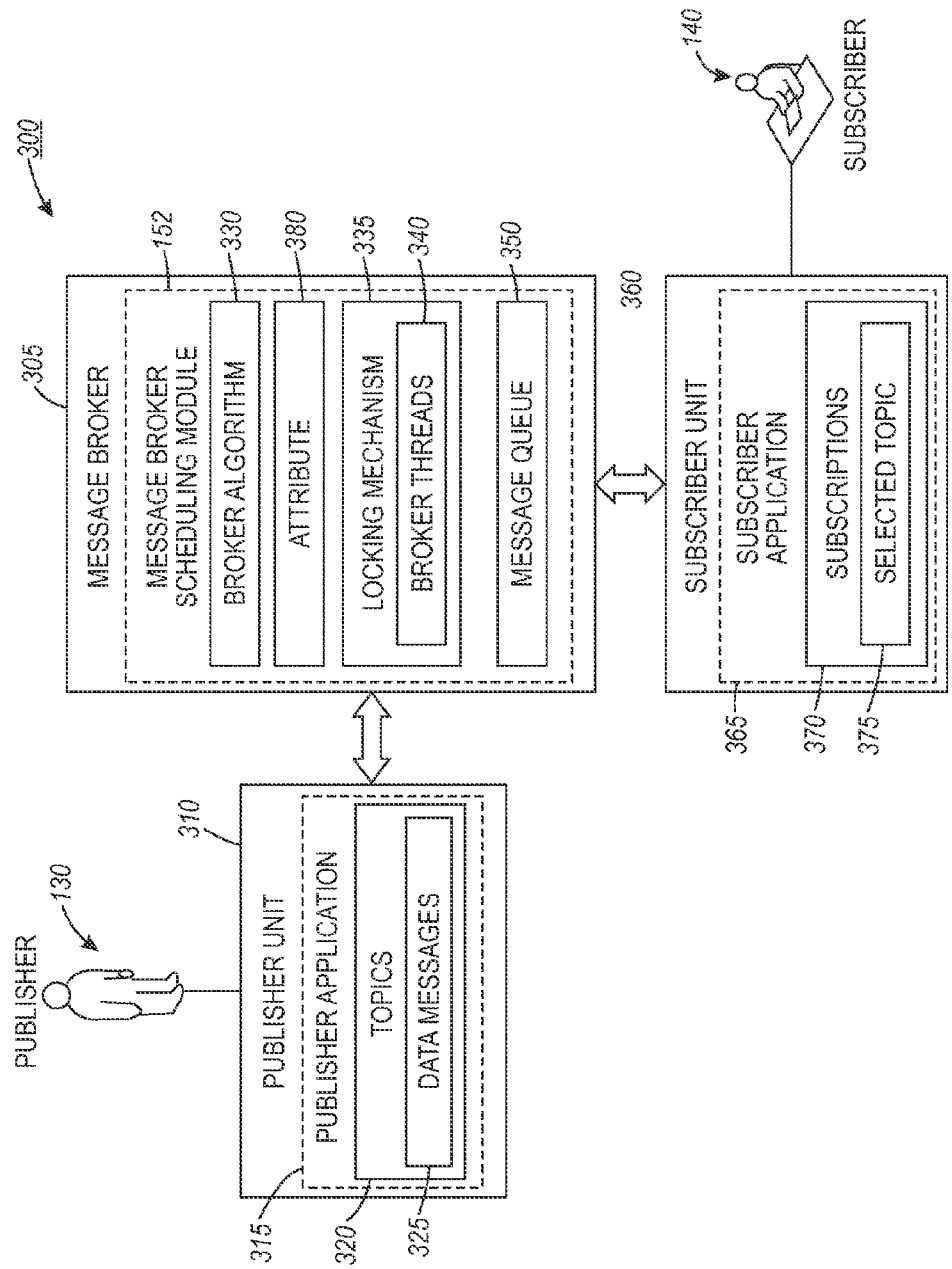
FIG. 4 illustrates a block diagram of a publish/subscribe data processing system associated with a message broker, in accordance with the disclosed embodiments.

FIG. 4 illustrates a block diagram of a publish/subscribe data processing system 300 associated with a message broker 305, in accordance with the disclosed embodiments. Note that in FIGS. 1-6, identical or similar blocks are generally indicated by identical reference numerals. The publish/subscribe data processing system 300 process and transmit a publish/subscribe data message 325 based on a topic 375 selected by a subscriber 140. The system 300 generally includes a publisher unit 310 and a subscriber unit 360 that are operatively configured in association with a message broker 305 for receiving and/or transmitting the data messages 325. The term "data message" as utilized herein can be a precisely formatted data that can be produced and consumed by applications and may represent a request, report, and/or an event. The messaging broker scheduling module 152 associated with the message broker 305 typically includes a message broker scheduling algorithm 330, a message queue 350 and a locking mechanism 335 for managing one or more broker threads 340.

The publisher unit 310 includes a publisher application 315 for providing a topic 320 along with the data messages 325 with respect to the publisher 130 to the message broker 305. Note that the term "topic" as utilized herein can refer to topics that are defined by the system ahead of time and publishers may publish on specific, pre-determined and common topics. Similarly, the subscriber unit 360 includes a subscriber application 365 in order to provide subscriptions 370 along with the selected topic 375 with respect to the subscriber 140 to the message broker 305. The broker system 300 accepts the subscriptions 370 from the subscribers 140 in order to perform a filtering function with respect to the data messages 325 via the scheduling algorithm 330. Note that the publisher unit 310 and the subscriber unit 360 can be the data-processing system 100, as depicted in FIG. 2.

The message broker scheduling module 152 associated with the message broker 305 receives the data messages 325 from the publisher 130 and stores with respect to a message queue 350. The broker thread 340 select the data messages 325 based on varying criterion such as, first-in/first out message sequence, messages that are not processed by another broker thread 340, and the messages that are not part of a sequential topic. The scheduling algorithm 330 includes an attribute 380 to the selected topic description in order to schedule the data messages 325 from the publisher 130 via the message broker 305. The scheduling algorithm 330 associated with the message broker scheduling module 152 processes and transmits the data messages 325 associated with the publishers 130 to the subscribers 140 based on the selected topic 375. The system 300 also generates an in-doubt list for identifying the data messages 325 that are in-progress of being delivered from the message queue 350 to the subscriber 140.

The locking mechanism 335 ensures mutual exclusion of the data messages 325 between the broker threads 340. The locking mechanism 335 processes the broker threads 340 by indicating the in-doubt list of data messages 325 in order to compare with the data messages 325 in the message queue 350 and prevent duplicate delivery of messages to the subscriber 140. Note that the message broker 305 in association with the scheduling algorithm 330 can be implemented as a software module installed into the data processing system 200. The message broker 305 can be a general purpose computer network that provides asynchronous communication between the publisher/subscriber applications.

Figure 5:
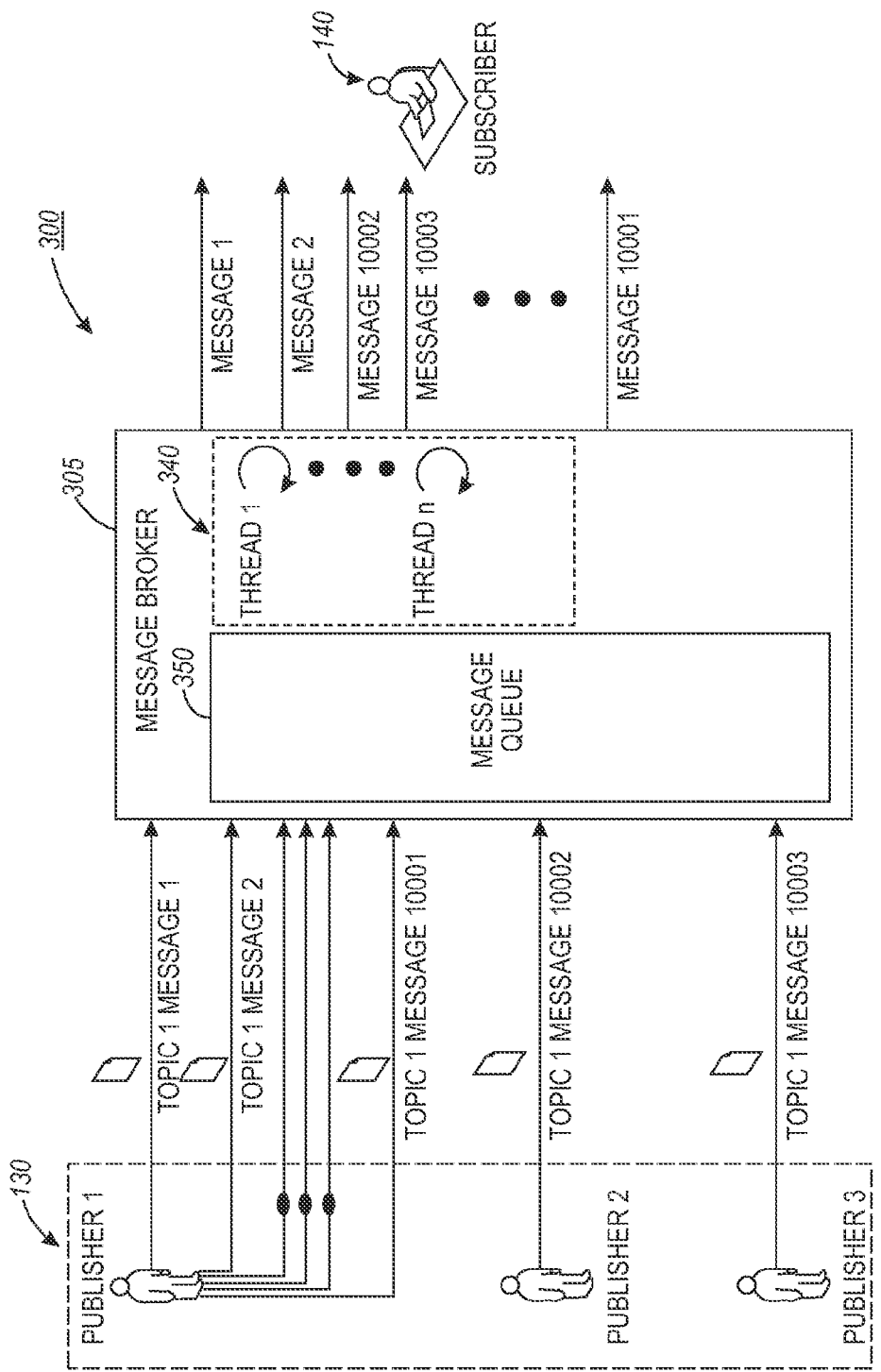
FIG. 5 illustrates a flow diagram of the publish/subscribe data processing system associated with the message broker, in accordance with the disclosed embodiments.

FIG. 5 illustrates a flow diagram of the publish/subscribe data processing system 300 associated with the message broker 305, in accordance with the disclosed embodiments. The publish/subscribe data processing system 300 effectively handles the communication between the publisher unit 310 and the subscriber unit 360 by coordinating the distribution of data messages 325. The system 300 can act as a middleware that matches the data messages 325 to the subscribers 140 and handles the delivery of the data messages 325. The scheduling algorithm 330 configured in association with the system 300 receives the data messages 325 along with the topics with respect to the publishers 130 and transmits to the subscribers 140 based on the selected topic 375. The attribute 380 can be added to the selected topic description in order to schedule the data message 325 from the publisher 130 with respect to the selected topic 375 via the message broker 305.

The scheduling algorithm 330 sequentially processes the data messages 325 associated with the specific topic from the publishers 130. The data messages 325 related to other topics with respect to the same publisher 130 can be processed simultaneously. The scheduling algorithm 330 simultaneously processes the data messages 325 with respect to the similar topic from other publishers 130. The message broker 305 in association with the scheduling algorithm 330 routes the data messages 325 and handles the responsibility for delivery of data messages 325, authentication and authorization of the subscribers 140. The message broker 300 performs store and forward functions in order to route the data messages 325 from the publishers 130 to the subscribers 140. Such an approach transmits a high volume of data messages while ensuring high levels of service.

Figure 6:
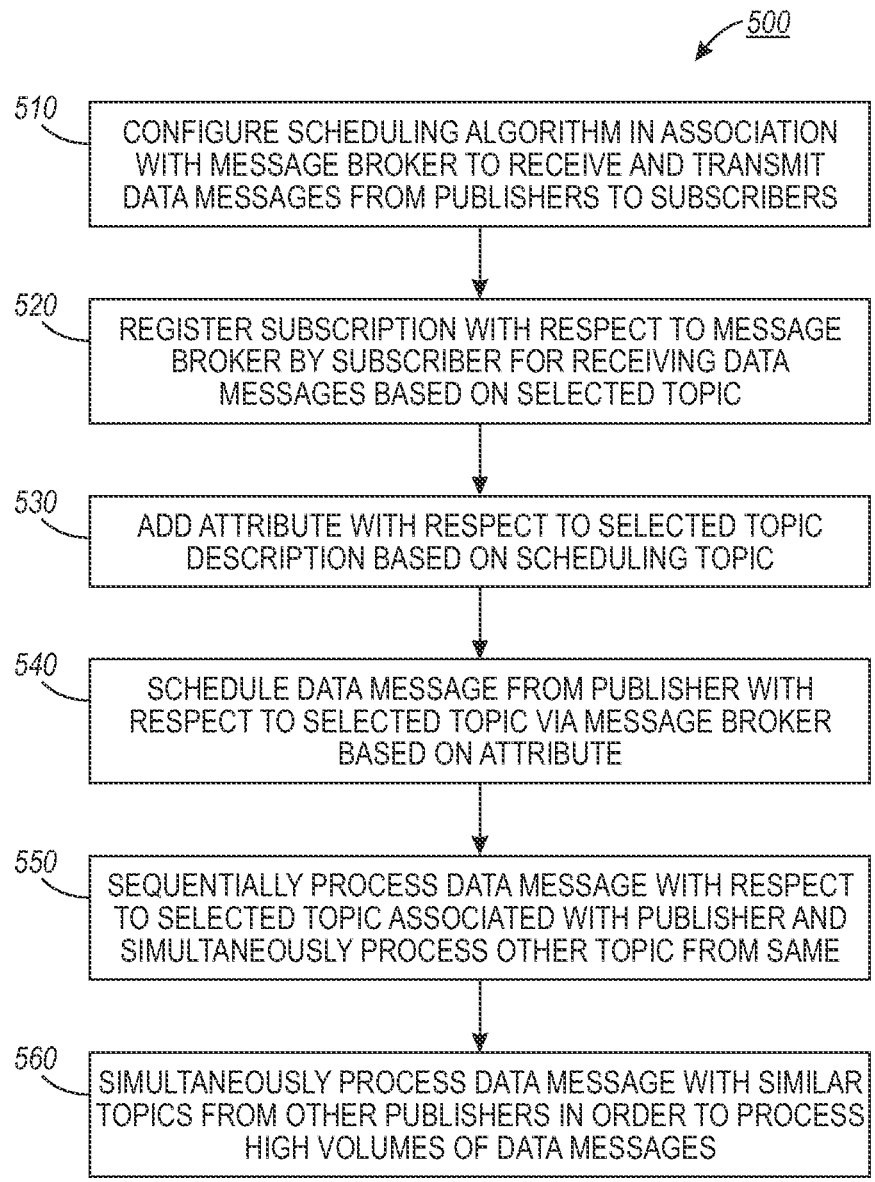
FIG. 6 illustrates a high level flow chart of operating illustrating logical operational steps of a method for processing a data message based on a message broker scheduling algorithm, in accordance with the disclosed embodiments.

FIG. 6 illustrates a high level flow chart of operating illustrating logical operational steps of a method 500 for processing the data message 325 based on the message broker scheduling algorithm 330, in accordance with the disclosed embodiments. The scheduling algorithm 330 can be configured in association with the message broker 305 in order to receive and transmit the messages 325 from the publishers 130 to the subscriber 140, as illustrated at block 510. The subscription 370 with respect to the message broker 305 can be registered by the subscriber 140 for receiving message 325 based on the selected topic 375, as depicted at block 520.

The attribute 380 with respect to the selected topic description 375 can be added based on the scheduling algorithm 330, as indicated at block 530. The data message 325 from the publisher 130 can be scheduled with respect to the selected topic 375 via the message broker 305 based on the attribute 380, as illustrated at block 540. The data message 325 with respect to the selected topic 375 associated with the publisher 130 can be sequentially processed. Other topics from the same publisher 130 can be simultaneously processed, as depicted at block 550. The data message 325 with similar topics from other publishers 130 can be simultaneously processed in order to process high volumes of the data messages 325, as indicated at block 560.

The system 300 disclosed herein can be therefore effectively employed in a wide variety of publish/subscribe data processing environments in order to enable the data messages to be distributed from the publisher to the subscribers based on a selected topic of interest. The broker network 305 effectively manages the subscription requests in a multicast messaging system comprising a plurality of publishers publishing information to the broker and a plurality of subscribers subscribing to the specific topics such as, for example, weather, news, politics, and leaders, etc received from one or more publishers. Such system and method can therefore provide a highly reliable and scalable data message processing in a wide range of publish/subscribe environments.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for processing a data message, said method comprising:

configuring a scheduling algorithm in association with a message broker in order to thereafter register a subscription with respect to said message broker by a subscriber for receiving a data message and receiving a topic associated with at least one publisher from said at least one publisher based on a selected topic, wherein said selected topic comprises a predefined topic;

adding an attribute with respect to said selected topic description based on said scheduling algorithm in order to schedule receipt of at least one additional data message from at least one of said at least one publisher or at least one other publisher with respect to said selected topic and said attribute via said message broker;

configuring said message broker to comprise at least one of at least one broker thread and a message queue, and configuring said message broker to include a locking mechanism for ensuring a mutual exclusion of said data message between said at least one broker thread; and sequentially processing said data message with respect to said selected topic associated with at least one of said at least one publisher and said attribute with respect to said at least one publisher or at least one other publisher in order to thereafter simultaneously process other messages including said topic including said topic as modified by said attribute from at least one of said at least one publisher or said at least one other publisher, thereby transmitting a high volume of data messages while ensuring a high level of service.

2. The method of claim 1 further comprising accepting said subscription with respect to said at least one subscriber in order to thereafter perform a filtering function with respect to said data message based on said specific topic via said scheduling algorithm.

3. The method of claim 2 further comprising configuring said message broker to comprise a message queue.

4. The method of claim 1 further comprising performing a store and forward function in order to route said data message from said at least one publisher to said subscriber.

5. A system for processing a data message, said system comprising:
   a processor;
   a data bus coupled to said processor; and
   a computer-usable medium embodying computer code, said computer-usable medium being coupled to said data bus, said computer program code comprising instructions executable by said processor and configured for:
   associating a scheduling algorithm with a message broker in order to thereafter register a subscription with respect to said message broker by a subscriber for receiving a data message and receiving a topic associated with at least one publisher from said at least one publisher based on a selected topic, wherein said selected topic comprises a predefined topic;
   adding an attribute with respect to said selected topic description based on said scheduling algorithm in order to schedule receipt of at least one additional data message from at least one publisher with respect to said selected topic via at least one of said at least one publisher or at least one other publisher with respect to said selected topic via and said attribute via said message broker;
   configuring said message broker to comprise at least one of at least one broker thread and a message queue, and configuring said message broker to include a locking mechanism for ensuring a mutual exclusion of said data message between said at least one broker thread; and
   sequentially processing said data message with respect to said selected topic associated with at least one of said at least one publisher and said attribute with respect to said at least one publisher or at least one other publisher in order to thereafter simultaneously process other messages including said topic including said topic as modified by said attribute from at least one of said at least one publisher or said at least one other publisher, thereby transmitting a high volume of data messages while ensuring a high level of service.

6. The system of claim 5 wherein said instructions are further configured for accepting said subscription with respect to said at least one subscriber in order to thereafter perform a filtering function with respect to said data message based on said specific topic via said scheduling algorithm.

7. The system of claim 6 wherein said instructions are further modified for configuring said message broker to comprise a message queue.

8. The system of claim 5 wherein said instructions are further configured for performing a store and forward function in order to route said data message from said at least one publisher to said subscriber.

* * * * *